United States Patent
Peltonen et al.

(10) Patent No.: US 8,119,792 B2
(45) Date of Patent: Feb. 21, 2012

(54) STARCH DERIVATIVES AND A METHOD FOR THEIR PREPARATION

(75) Inventors: Soili Peltonen, Rajamäki (FI); Hannu Mikkonen, Rajamäki (FI); Thomas Gädda, Helsinki (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 0 days.

(21) Appl. No.: 10/504,296

(22) PCT Filed: Feb. 17, 2003

(86) PCT No.: PCT/FI03/00116
§ 371 (c)(1),
(2), (4) Date: Sep. 29, 2004

(87) PCT Pub. No.: WO03/068823
PCT Pub. Date: Aug. 21, 2003

(65) Prior Publication Data
US 2005/0107603 A1    May 19, 2005

(30) Foreign Application Priority Data
Feb. 15, 2002   (FI) .................................. 20020313

(51) Int. Cl.
*C08B 31/02* (2006.01)
*C08B 31/08* (2006.01)

(52) U.S. Cl. ........ 536/107; 536/108; 536/110; 536/111; 536/124

(58) Field of Classification Search ............ 536/4.1, 536/102, 107, 108, 110, 111, 124
See application file for complete search history.

(56) References Cited

U.S. PATENT DOCUMENTS

| | | | |
|---|---|---|---|
| 3,346,558 A * | 10/1967 | Roth | 536/18.6 |
| 4,011,389 A | 3/1977 | Langdon | |
| 4,968,785 A | 11/1990 | Moser et al. | |
| 5,079,350 A * | 1/1992 | Fujita et al. | 536/18.6 |
| 5,212,292 A * | 5/1993 | Ripke | 536/18.6 |
| 5,490,978 A * | 2/1996 | Spaltro et al. | 424/49 |
| 5,773,256 A * | 6/1998 | Pelenc et al. | 435/74 |
| 6,011,092 A * | 1/2000 | Seppala et al. | 524/47 |
| 6,506,824 B1 * | 1/2003 | Bastioli et al. | 524/47 |

FOREIGN PATENT DOCUMENTS

| | | |
|---|---|---|
| DE | 197 14 166 A1 | 10/1998 |
| DE | 19924771 A1 | 12/2000 |
| EP | 0 603 768 A1 | 6/1994 |
| WO | WO-98/29455 A1 | 7/1998 |

OTHER PUBLICATIONS

M. Biermann et al., "Alkylpolyglucoside—Technologie and Eigenschaften," Starch/Stärke, vol. 45, 1993, pp. 281-288.
M. Bean et al., "Fatty esters of polyalkoxylated polyol glycosides as bread additives," Food Prod. Dev., vol. 7, 1973, pp. 30 and 32.
P. Throckmorton et al., "Biodegradable Surfactants Derived from Corn Starch," Journal of the American Oil Chemists' Society, vol. 51, Nov. 1974, pp. 486-494.
K. Decossas et al., "Crude Glycerol Glucoside Esters of Cottonseed Oil: Preliminary Cost Analysis," Journal of the American Oil Chemists' Society, vol. 55, Jul. 1978, pp. 567-571.
R. Feuge et al., "Surface Activity of Glycerol Glycoside Palmitates," Journal of the American Oil Chemists' Society, vol. 49, Nov. 1972, pp. 672-673.
I. Wolff et al., "The Acylation of Corn Starch, Amylose and Amylopectin," Journal of the American Oil Chemists' Society, vol. 73, Jan. 1951, pp. 346-349.
A. Gros et al., "Properties of the Fatty Acid Esters of Amylose," The Journal of the American Oil Chemists' Society, vol. 39, Jan. 1962, pp. 19-24.
F. H. Otey et al., Journal of the American oil chemists, vol. 40, Feb. 1963, p. 76-78.
W.J. McKillip et al., Journal of Paint Technology, vol. 42, No. 544 May 1970, p. 312-319.

* cited by examiner

*Primary Examiner* — Shaojia Anna Jiang
*Assistant Examiner* — Everett White
(74) *Attorney, Agent, or Firm* — Birch, Stewart, Kolasch & Birch, LLP

(57) ABSTRACT

The invention relates to novel transglycosylation products and their preparation. The transglycosylation products according to the invention are prepared from starch derivatives, such as esters or ethers of starch. The products are obtained by reacting a starch derivative with an alcohol in the presence of an acid catalyst. The forming product is separated by precipitation or by removing any unreacted alcohol by evaporation. In the products according to the invention the good properties of starch derivatives, such as the excellent water resistance of esters, are combined with the versatility of transglycoside products. The products can be used as adhesives, in which case they are formulated, for example as hot-melt adhesives, and as comonomers, prepolymers or macroinitiators in the preparation of polymers.

2 Claims, No Drawings

STARCH DERIVATIVES AND A METHOD FOR THEIR PREPARATION

The present invention relates to transglycosylation products and their preparation. The invention relates in particular to transglycosylation products of a starch derivative.

The invention also relates to a method for the preparation of such products characterized by reacting an ester or ether derivative of starch at acid conditions with an alkanol containing 1-6 hydroxyl groups, and recovering the reaction product.

The invention also relates to uses of the novel starch derivatives and to the intrinsic ethylene glycol ether having an intra-chain etherified starch acetate containing a segment having the formula:

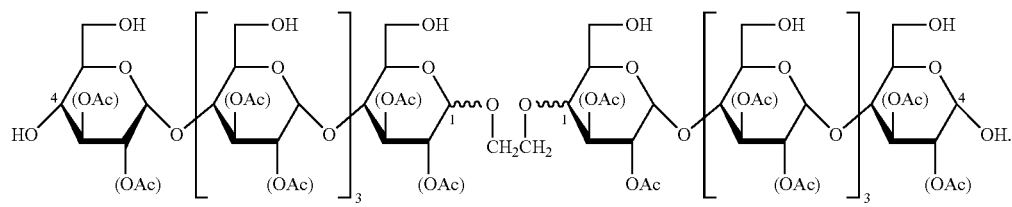

Starch transglycosylation products are previously known. Transglycosylation products have been prepared from native starch by causing the starch to react with various alcohols, such as methanol, butanol, ethylene glycol, propylene glycol or glycerol, in acid conditions, whereby there are formed alkyl glycoside compounds, which in this context are also called "transglycosylation" products. In these, an alkyl or hydroxyalkyl group is linked through an ester bond to C-1 of the anhydroglucose unit. Corresponding products have also been prepared from the monomer of starch, i.e. glucose.

In known technology aiming at oligomeric products, butyl glucosides are first produced by transglycosylation. The starting material in the preparation has been glucose or starch. When starch has been used it has been necessary to use a pressure of $4 \times 10^5$ Pa and a temperature of 140° C. Starting from glucose it is possible to operate at normal pressure.

From butyl glucosides there have further been prepared alkyl polyglucosides by allowing the butyl glucosides to react with another, usually long-chain alcohol. In this case the alcohol (butanol or methanol) used in the first step of the reaction has been replaced with the longer-chain alcohol of the second step. In the second step, a pressure of $2 \times 10^3$ Pa and a temperature of 120° C. have been used. The products have been surfactants for various uses.

The chain length of the anhydroglucose—expressed as the degree of polymerization (DP)—has been 1-7, i.e. its molecular weight has been at its maximum 1151+(hydroxy)$_n$alkyl oxide chain.

The above technology is described in the publication Manfred Biermann, Karl Schmid und Paul Schulz, "Alkylpolyglucoside—technology und Eigenschaften", Starch/Stärke 45 (1993) No. 8, p. 281-288.

The transglycosylation technology has also been used for the preparation of surfactants by the use of a slightly different reaction path. Thus, with diol or glycerol, the transglycosylation reaction has been carried out up to the monomer stage, in the second step the obtained product has been treated with ethylene oxide or propylene oxide to prepare a polyether chain, and the third step has been the esterification of the ether with a fatty acid. Thereby the product obtained has been the fatty acid ester of polyalkoxylated polyol glycoside (M. M. Bean, C. L. Mehltretter, C. A. Wilham and T. A. McGuire, "Fatty esters of polyalkoxylated polyol glycosides as bread additives", Food Prod. Dev. 1973, Vol. 7, p. 30-32; F. H. Otey, C. L. Mehltretter, C. E. Rist, "Polyoxyethylene Ethers of Some Polyol Glycosides and Their Fatty Esters", J. Am. Oil Chem. Soc., 1963, Vol 40, p. 76-78; and Peter E. Throckmorton, Richard R. Egan and David Aelony, Gayle K. Mulberry, Felix H. Otey "Biodegradable Surfactants Derived from Corn Starch", J. Am. Oil Chem. Soc., 1974, Vol 54, p. 486-494).

Surfactants have also been prepared by carrying out transglycosylation with glycerol up to the monomer stage and by esterifying the obtained product with a fatty acid (K. M. deCossas, R. O. Feuge, J. L. White, S R., and L. W. Mazzeno, J R., "Crude Glycerol Clucoside Esters of Cottonseed Oil: Preliminary Cost Analysis", J. Am. Oil Chem. Soc. 1978, Vol 55, p. 567-571; and R. O. Feuge, Mona Brown, J. L. White, "Surface Activity of Glycerol Glycoside Palmiates", J. Am. Oil Chem. Soc., 1972, Vol 49, p. 672-673).

The state of the art has also been described in the patent literature. Thus, U.S. Pat. No. 4,011,389 describes how non-ionic surfactants can be prepared from starch or dextrose by carrying out transglycosylation with propylene glycol or methoxyethanol and then by causing the product to react with alkyl epoxy (e.g. 1,2 epoxydecane) or other epoxy compounds.

DE Patent No. 19714166 discloses transglycosylation of potato starch with glycerol by using sulfosuccinic acid as catalyst. The molecular weight of the product was 16,000. It was used as a 16% solution in the said application.

Known technology has also been described in DE Patent Application No. 19924771 and U.S. Pat. No. 4,968,785. The first document discloses a transglycosylated product of hydroxyalkyl starch or a mixture thereof, produced from a lower alcohol. The product is water-soluble. It has been used for the preparation of polyurethanes. U.S. Pat. No. 4,968,785 discloses a transglycosylation product, which has been prepared from a cationic starch derivative and a monohydric alcohol and which can be easily purified.

In addition to surfactants, also other uses have been proposed for transglycosylation products. In order to prepare alkyds, the transglycosylation reaction has first been carried out with ethylene glycol to the monomer stage, and thereafter various alkyd resins have been prepared from the product (W. J. Mckillip, J. N. Kellan, C. N. Impola, R. W. Buckney, "Glycol Glycosides in Alkyds", J. Paint Technol. Vol. 42, No. 544, May 1970, p. 312-319).

Ethylene glycol- and glycerol-based transglycosylation products of starch have also been used polyetherized for the preparation of rigid urethane foams. The transglycosylation has been carried out in a known manner, and the product has been allowed to react with propylene glycol to produce polyether, and this has been used as the polyol component in a reaction with di-isocyanates.

For the sake of completeness it should further be mentioned that the transglycosylation of starch with ethylene glycol and glycerol has also been carried out by extrusion techniques. From ethylene glycol glucosides produced by extrusion techniques there has further been prepared, with propylene glycol, a polyether, and this has been used for the preparation of polyurethane foams.

In summary, it can be stated that, in known technology, transglycosylation products have been prepared from native starch, in which case the reaction has been carried out at conditions that cause the degradation of the starch chains to glucose monomers or glucose oligomers that contain a few anhydroglucose units. Compounds of this type have been usable as surfactants, since it has been possible to link a hydrophobic alkyl chain to the anhydroglucose group. The use of monomeric methyl glycoside as a hot melt adhesive is previously known, but no other adhesive applications have been suggested.

The state of the art involves disadvantages that limit the usability of the known products. The transglycosylated monomers or oligomers are soluble in water, as surfactants should be, and therefore they are not suitable for uses in which resistance to water or a good barrier to water vapor is required. The resistance of the compositions to water could, in principle, be improved by mixing with them, for example, starch acetate, but since the transglycosylated starch monomers or oligomers are not capable of plasticizing starch esters, a plasticizer must at the same time be added to the compositions, and this raises the preparation costs.

According to the reaction temperature of the transglycosylation, many of the known compositions are additionally colored, and the solutions need to be bleached separately by means of active carbon before they can be taken into use.

An anhydroglucose unit obtained from native starch has 3 free hydroxyl functions in addition to the OH group at C-4. For this reason, the use of such a transglycosylated monomer as a unit in polymers will lead in polymerization to an uncontrolled situation, in which the polymer chain may grow from any hydroxyl. The result obtained is often various branched and crosslinked structures.

The native polymer structure and high molecular weight of starch set limits to the processibility of the new polymers.

It is an object of the present invention to eliminate the disadvantages associated with the known technology and to provide novel starch-based products that are better suited than native starch for structural units in, for example, adhesives and polymers.

The invention is based on the idea that the transglycosylation products are prepared from starch derivatives, such as starch esters or starch ethers. Our experiments were mainly carried out with starch esters, and it was surprisingly observed that the ester groups of starch acetate were retained in the anhydroglucose unit during the transglycosylation reaction. The products obtained therefore have the known good properties of starch derivatives, such as the excellent water resistance of esters—this concerns in particular derivatives having a high degree of polymerization and a high degree of substitution—combined with the versatility of transglycoside products and the intrinsic plasticization introduced by the alkyl or hydroxyalkyl ether group, which makes the product soft and processable.

Even though the products retain the basic properties of the starting material, transglycosylation can, however, be used for affecting the esterification profile of the anhydroglucose unit. It has namely also been observed, surprisingly, that the ratio of the ester groups of the primary and the secondary hydroxyls can be changed by transglycosylation.

The products according to the invention can be prepared simply by forming a mixture of a starch derivative and an etherizing alcohol, which mixture is stirred and heated until a clear melt or mixture is obtained. To catalyze the reaction, a catalytic amount of an acid substance, such as sulphuric acid, is added to the alcohol. After the reaction, the transglycosylated product is recovered. When ester-based products are prepared, the transglycosylated product is—according to the degree of substitution of the starch derivative—poorly soluble or insoluble in water, in which case the product can be separated from the mixture simply by precipitating it in water. Alternatively, the transglycosylated product is recovered by removing the alcohol by evaporation.

The products obtained by means of the invention are novel. A particularly preferred compound is, for example, an acetylated anhydroglucose oligomer that contains 2-300, for example 2-100, anhydroglucose groups.

More specifically, the products according to the invention are primarily characterized by being the transglycosylation product of a starch derivative.

The method according to the invention is for its part characterized by reacting an ester or ether derivative of starch at acid conditions with an alkanol containing 1-6 hydroxyl groups, and recovering the reaction product.

The uses according to the invention are as an adhesive, such as a hot melt adhesive, as a prepolymer in polyurethane synthesis, as a large-sized comonomer in lactic acid condensation polymerization, as a macroinitiator in ring-opening polymerization of $\epsilon$-caprolactone and as a hydrophobic coating.

Considerable advantages are provided by the invention. Thus, by varying the degree of polymerization (DP) of the transglycosylated product and the degree of substitution (DS) of the anhydroglucose units, highly different properties can be achieved by means of the invention. Products having a low degree of substitution and/or a low degree of polymerization are relatively well soluble in water.

Starch acetate transglycosylation products according to the present invention can be used in adhesives and as hydrophobic coatings. In particular they can be used for preparing hot-melt adhesives, in which case the product is plasticized using a suitable plasticizer. By controlling the conditions and reaction time of the transglycosylation reaction and the amounts of reagents it is possible to influence the molecular weight of the product and the content of the esterifying group (e.g. acetyl), which enables the properties (viscosity, adhesiveness, melting point, hydrophobicity) of the adhesive to be modified. Additives commonly present in hot melt adhesives can be used, but good adhesion can be achieved even otherwise. Solution adhesives can be prepared from transglycosylation products which have been obtained from water-soluble starch derivatives or which become water-soluble as a result of the transglycosylation reaction.

Good gluing results are obtained, for example, when two starch-derivative (e.g. starch acetate) transglycosylation products of different molecular weights are mixed, in which case one gives the adhesive stiffness and the other adhesiveness. The mixing of two products structurally of the same type also provides the advantage that there will be no problems of compatibility between the components, such problems being visible as turbidity of the adhesive and having a deteriorating affect on the gluing results.

We have observed that functional groups of a starch derivative, in particular ester groups, protect the products from changes of color during transglycosylation. The compositions produced are therefore white, and they need not be separately purified or treated with active carbon. Since the products are white, they can be used for gluing, for example, paper or board products the opacity of which is relatively poor.

As to the structure of the transglycosylation product and the biodegradability of the product, according to the present invention the reaction can be directed by affecting the stability/degradation of the acetate group at C-6. It has been shown in the literature that the acetate group at C-6 lowers enzymatic biodegradability.

Starch acetate transglycosylation products can also be used in the preparation of polymers, for example as macroinitiators in ring-opening polymerization or in the linking of oligomers to starch products. The grade of the polymer formed can be affected by the degree of esterification (in general acetylization) of the product. Depending on the polymerization method, the products have different melting and glass transition temperatures. Products having low melting points can be used as such in hot-melt adhesives, without external plasticizers. Products having higher melting points require plasticization.

The invention will be examined below in greater detail with the help of a detailed description and a number of examples.

As described above, the starch-based component in the invention is a "starch derivative". By this is meant a product obtained from starch through a chemical reaction, at least some of the anhydroglucose units of the product having groups modifying hydroxyl functions. Typically the starch derivative is a starch ester, starch ether, starch mixed ester/ether or grafted starch prepared from native starch, hydrolyzed starch, oxidized starch, crosslinked starch or gelatinized starch. The starch for its part may be based on any native starch having an amylose content of 0-100% and an amylopectin content of 100-0%. Thus the starch may be derived from barley, potato, wheat, oats, peas, corn, tapioca, sago, rice or similar tuber of grain.

In particular, the starch derivative used in the invention is based on products prepared from the said native starches by oxidation, hydrolyzation, crosslinking, cationation, grafting, etherification, or esterification.

It has been noted to be suitable to use a starch-based component that is derived from an ester formed by a starch and one or more aliphatic $C_{2-24}$ carboxylic acids. The carboxylic acid component of such an ester may in this case be derived from a lower alkanic acid, such as acetic acid, propionic acid or butyric acid, or a mixture thereof. The carboxylic acid component may, however, also be derived from a native saturated or unsaturated fatty acid. Examples that can be mentioned of these include palmitic acid, stearic acid, oleic acid, linoleic acid, and mixtures thereof. The ester may also be made up of both long- and short-chained carboxylic acid components. A mixed ester of acetate and stearate can be mentioned as an example. For the forming of the ester it is also possible to use, in a known manner, in addition to acids, also corresponding acid anhydrides and acid chlorides and other similar reactive acid derivatives. The acids used are generally monofunctional with respect to the acid function, but it is also possible to employ multifunctional acids, such as adipic acid, sebasic acid, maleic acid and succinic acid. The acids may contain hydroxyl groups and unsaturated bonds, but no cationic additional functionality. The cationic functionality increases the water-solubility of the esters, which is not considered to be advantageous with respect to the practical applications of the invention.

In addition to native starch, also hydroxyalkylated starch or oxidized starch or hydrolyzed starch can be used for preparing the ester.

When the product has ester bonds, as is the case in the preferred embodiment of the invention, a particularly advantageous situation is reached: the ester bonds increase the thermal stability and render the product water resistance. We have surprisingly found that the ester bonds will be maintained during transglycosylation when operating according to the invention.

The preparation of the fatty acid esters of starch is carried out, for example, as is disclosed in publications in the field: Wolff, I. A., Olds, D. W. and Hilbert, G. E., The acylation of Corn Starch, Amylose and Amylopectin, J. Amer. Chem. Soc. 73 (1952) 346-340 and Gros, A. T. and Feuge, R. O., Properties of Fatty Acid Esters of Amylose, J. Amer. Oil Chemists' Soc. 39 (1962) 19-24.

In the examples below, the invention is illustrated mainly by using transglycosylation products of starch acetates as an example. A starch acetate can be prepared by allowing a starch to react with acetanhydride in the presence of a catalyst. The catalyst used is, for example, 50% sodium hydroxide. Even other known acetate preparation methods disclosed in the literature in the field are suitable for the preparation of starch acetate. By varying the amount of acetic acid anhydride, the amount of the base used as the catalyst and the reaction time, it is possible to prepare starch acetates of different degrees of substitution. An example of a suitable preparation process is the method mentioned in FI patent 107386, wherein the esterification is carried out under pressure.

According to one preferred embodiment, the starch component is an esterified starch, most preferably a starch acetate having a degree of substitution of 0.5-3, preferably 1.5-3, and most suitably 2-3.

According to another preferred embodiment, the starch component is a hydroxyalkylated starch or its ester. In this case especially preferable are hydroxypropyl starch having a molar degree of substitution at maximum 1.4, preferably at maximum 1, and hydroxypropyl starch esters having a molar degree of substitution at maximum 1.4, preferably at maximum 1 and especially preferably 0.1-0.8, and the degree of substitution is at minimum 2, preferably 2.5-3.

The transglycosylation products are prepared from the above-mentioned starch derivatives by reacting the derivative in acid conditions with an alkanol that contains 1-5 hydroxyl groups and by recovering the reaction product. In general the starch ester is mixed with a mono-, di- or triol to form a reaction mixture, the reaction mixture is heated, and the reaction of the starch ester with the mono-, di- or triol is continued until a clear mixture is obtained, the reaction mixture is cooled, and the reaction product is precipitated, washed and dried. The reaction product is precipitated in, for example, water.

The alcohol component used is in particular a lower alcohol, having 1 to 6 carbon atoms and 1 to 5 hydroxyl groups, in particular 1 to 3 hydroxyl groups. Methanol, ethanol, n-propanol, isopropanol-, n-butanol and sec-butanol, substituted lower alcohols, such as methoxyethanol, ethoxyethanol, methoxymetanol and ethoxymetanol, and alcohols, which contain 2 or 3 hydroxyl groups, such as ethylene glycol, propylene glycol and glycerol, can be mentioned as examples.

The advantage associated with the use of diols, triols and, generally, polyols is that according to the invention it is possible to produce, if so desired, dimeric, trimeric etc. structures containing anhydroglycose units (depending on the OH-functionality of the alcohol used). This is not possible if a monoalcohol is used. If the aim is not to produce a dimeric etc. structure, there will be an alcohol group attached by ether bonds to the C-1 carbon, when polyhydric alcohols are used, and that alcohol group is capable of further reacting. This is not possible when a monoalcohol is employed as alcohol.

Depending on the number of hydroxyl groups, generally 0.01 to 20 wt-% of the alcohol component is used, based on the mass of the carbohydrate component. Generally, 0.1 to 10 wt-% of ethylene or propylene glycol from the starch ester or ether is a suitable amount.

The acidic catalyst of the transglycosylation reaction can be, e.g., a strong mineral acid, such as sulphuric acid, hydrochloric acid, nitric acid, a strong organic acid, such as paratoluene sulfonic acid, methane sulfonic acid, benzene sulfonic acid or trifluoromethane sulfonic acid, or a mono- or polyalkylated aryl-mono- or polysulfonic acid, such as xylene or cumene sulfonic acid or dodecylbenzene sulfonic acid, or acidic ion exchanger.

The acid catalyst is typically employed in amounts of about 0.0005 to about 5 mole-%, preferably about 0.002 to about 2.0 mole-%, in particular about 0.015 to 0.3 mole-%, of the amount of carbohydrate.

The products obtained with the help of the invention can be used for the production of polymers, for example, as a prepolymer in polyurethane synthesis, as a large-sized comonomer in lactic acid condensation polymerization, and as a macroinitiator in ring-forming polymerization of ε-caprolactone.

The DP of the products is in general 2-500, usually 2-300. Their weight average ($M_w$) molar masses/molecular weights are approx. 400-250,000, typically approx. 1,000-100,000. Small-molecular products ($M_w$ 400-15,000) are suitable in particular for the preparation of polymers, in hot-melt adhesives there are used products having a molecular weight of 5,000-250,000, preferably approx. 10,000-100,000.

However, the novel products are used in particular for various adhesive applications. Hot melt adhesives and solution adhesives can be obtained from them. Especially advantageously the products according to the invention can be used for the preparation of adhesives having a high solids content. The solids content of an adhesive is at least 50% by weight (50-100% by weight); in solution adhesives, solids contents of 50-85% by weight are attained, and in hot-melt adhesives the proportion of solids may be up to 100% by weight.

By "solution adhesive" is meant in this context an adhesive wherein the starch derivative is at room temperature dissolved in the medium (i.e. primarily water) of the composition. Solution adhesives are prepared from transglycosylation products formed from esters having a DS of at maximum 1, and from starch ether derivatives (e.g. hydroxypropyl starch).

The compound according to Formula 1 is presented as an example of a transglycosylation product used in solution adhesives It is possible to prepare from the compound, for example, a 60% aqueous solution.

Starch derivative based polyols according to the invention may be present in an adhesive composition 0.1-75% by weight, most suitably 1-60% by weight, preferably 5-50% by weight, depending on the application and the desired viscosity. The adhesive compositions according to the invention may be admixed with various crosslinking inorganic chemicals such as boric acid or its salts such as borax, Zr salts or water-soluble silicates. In adhesive compositions according to the invention it is possible to use various polyfunctional compounds, for example, dialdehydes such as glyoxat or glutaraldehydes, diepoxides such as ethyleneglycol diglycidyl ether, urea, urea derivatives such as hydroxymethyl urea, tannin, or multifunctional carboxylic acids such as citric acid. It is further possible to add to the adhesive compositions various additives and regulators, such as water-soluble ethylene glycol esters, ethylene glycol ethers such as polyethylene glycol, glycerol esters such as monoacetin, CMC, or other water-soluble cellulose derivatives such as methyl or ethyl cellulose. Proteins, such as collagen, hydrolyzed casein, or grain protein such as gluten can also be added to solution adhesives.

The most important adhesive application of the transglycosylated products prepared on the basis of starch esters, such as starch acetates, having a high degree of substitution (DS>1) consists of hot-melt adhesives, in which their resistance to water can be exploited.

Hot-melt adhesives have previously been prepared from starch acetates. EP application publication 0 603 768 describes a method wherein a hot-melt adhesive is prepared from a starch ester, chain length $C_2$-$C_{18}$, degree of substitution DS 0.3-3.0, by plasticizing the ester with a non-volatile polar diluent such as glycerol, ethoxylated phenol, ethoxylated bisphenol A, N-(2-hydroxyethyl)-12-stearamide, the amount of which is 20-90% of the amount of the ester. The optional components of the adhesive composition include polyvinyl alcohol or ethylene/vinyl alcohol polymer (amount 0-35%), sizing resin (amount 0-70%) and antioxidants (amount 0-3%).

The components have been mixed together in a Brabender-type extruder at 130-150° C. It has been stated that the product has good adhesive properties in the gluing of paperboard. The starch used as the starting material may have been hydrolyzed, but not strongly degraded; the limit of <10 has been given for the dextrose equivalent. In the known solution the esters of a low degree of substitution (DS) were pre-plasticized with water, which was then removed by evaporation. The other esters were pre-plasticized with a portion or the whole amount of the diluent.

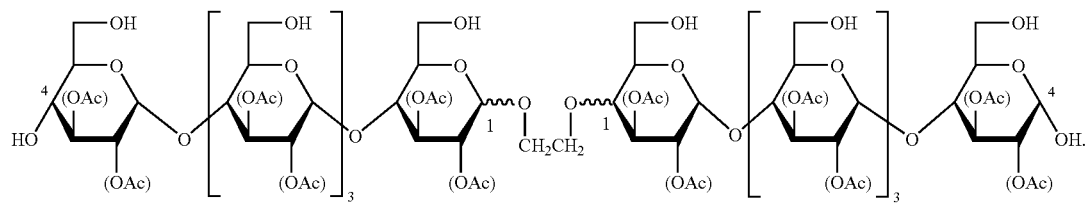

The said compound is an intrinsic ethylene glycol ether that contains 9% diol and 18% ether bonds. It is acetylated, the total degree of acetylation (DS) being 0.9. C-2: 0.35; C-3: 0.44; C-6: 0.1. The degree of polymerization is on average 5.6 AGU at each end of the diol. $M_w$: 3200 g/mol An adhesive composition, prepared from the transglycosidation product of the present invention, differs from the starch acetate based adhesive described above in more than one respect. The molecular weight of the starch-based component is lower, whereby lower melting products are arrived at, i.e. a hot-melt adhesive can be prepared by simple melting, and no extrusion is required. When so desired, however, the products can be prepared in a melt mixer. From the products according to the invention a hot-melt adhesive can be prepared in one process, in which case transglycosylation is first carried out in accordance with Test 3 of Example 6, and after the evaporation of the ethyleneglycol the desired amount of plasticizer is added to the product in order to produce a hot-melt adhesive. For the preparation of hot-melt adhesives, the transglycosylation products are mixed with a plasticizer. The plasticizer amount is most suitably 0.01-95% by weight, preferably approx. 1-50% by weight, typically approx. 30-50% by weight, of the weight of the composition. Any monomeric or polymeric plasticizers are suitable for use. Preferably, however, monomeric ones are used, such as one or more of the following: triacetin, diacetin, monoacetin, triethyl citrate, tributyl citrate, acetyltriethyl citrate, acetyltributyl citrate, dimethyl succinate, diethyl succinate, oligoester of succinic acid and diols, ethyl lactate, methyl lactate, fatty acid of glycerol, ricinic acid, olive oil, rapeseed oil, tall oil, dibutyl phthalate and diethyl phthalate.

The following non-limiting examples illustrate the invention:

EXAMPLE 1

Laboratory-Scale Transglycosylation of Starch Acetate with Butane Diol 150 g of butane diol, 0.5 g of sulfuric acid and 100 g of starch triacetate were mixed in a reaction flask. The temperature of the reaction mixture was raised to 115° C. At three hours, the solid reaction mixture turned into a clear viscous liquid. The reaction mixture was cooled to room temperature and was mixed with 1500 ml of acetone. The formed white precipitate was filtered, washed with acetone and dried in a vacuum oven.

The product obtained was 55 g of acetylglucoside-butanediol ether. The product was examined using NMR, and the degree of polymerization obtained for it was DP 2. Of the acetyl content of the original product, 68% had been retained, and the acetyl groups were as a rule at C-2 (42%) and C-3 (53%). Fewer than 3% of the acetyl groups were at C-6, i.e. the method provides a simple method of preparing C-2 and C-3 acetyl-protected starch-based oligomers.

EXAMPLE 2

Transglycosylation of Starch Acetate with Butane Diol in Different Conditions

The test was carried out in the manner described in Example 1 by using the reagent amounts and reaction conditions indicated in Table 1. The results of the NMR measurements of the products are also compiled in Table 3.

TABLE 1

Transglycosylation of starch acetate with butane diol.

| Code Lab. test | Starch acetate | Starch/ butane diol molar ratio | Starch/ butane diol mass ratio | Conditions | Products | Assay method |
|---|---|---|---|---|---|---|
| TG-4 | C6N100 | 1:3 | 1:1.5 | 4 h, 115° 0.35% $H_2SO_4$ | DP~3 DS $\geqq$ 1 Oac C-2/C-3 | NMR 1H, $^{13}$C |
| TG-5 | C6N100 | 1:3 | 1:1.5 | 3 h, 115° 0.35% $H_2SO_4$ | DP~3 DS: 2.2 OAc C-2/C-3 | NMR Ih, $^{13}$C |
| TG-9 | C6N100 Dry | 1:2 | 1:6 | 10 h, 115° 0.2% $H_2SO_4$ | Monomers + oligomer | HPLC |

The degree of substitution of C6N100 is 2.8.

It can be seen from the results that the reaction conditions do have an effect on the molecular weight and degree of substitution of the product.

EXAMPLE 3

Laboratory-Scale Transglycosylation of Starch Acetate with Glycerol

The transglycosylation reaction of a starch acetate (DS 2.8) and glycerol was carried out varying the reagent amounts and the reaction conditions. The conditions are described in Table 2. Two phases formed in the reaction mixture during the reaction. The liquid reaction mixture solidified upon cooling. The product was ground mechanically and was washed with water. 20 g of the TG-6 product consisted of a water-insoluble product. Test TG-7 yielded 71 g of a water-insoluble product that was completely soluble in acetone. The acetyl content of the products, measured titrimetrically, by NMR and by FTIR was high, almost at the level of the starting material.

TABLE 2

Laboratory-scale transglycosylation of starch acetate with glycerol

| Code Lab. test | Starch acetate/ glycerol molar ratio | Starch acetate/ glycerol mass ratio | Conditions | Products | Assay method |
|---|---|---|---|---|---|
| TG-6 | 1:6 | 1:2 | 5 h 140-150° 2 PHASES | DP <30 + monomers | NMR, HPLC FTIR, HPLC |
| TG-7 | 1:12 -> 1:6 | 1:4 -> 1:2 | 4 h 120° 2 PHASES | DP 30, DS acet. >2.6 | NMR/HPLC FTIR |

EXAMPLE 4

Pilot-Scale Transglycosylation of Starch Acetate with Glycerol 5 kg of a starch acetate (C6N100 EP Batch 5C42), 3.2 kg of glycerol and 50 g of sulfuric acid were mixed in a reactor. The reaction mixture was heated by feeding steam at 2.5 bar to the reactor mantle. The temperature in the reactor was 120° C. At 3 h the reaction mixture melted to a plastic mix. The mixture contained two phases. The glycerol phase, which had become brown, was separated. The molten product fraction hardened upon cooling. The product was crushed mechanically and was washed with water. The water-insoluble product (7TG-2) was a white powder that dissolved well in acetone. The product corresponds to the preceding laboratory-scale test TG-7.

XAMPLE 5

Transglycosylation of Starch Acetate with Ethylene Glycol

The material amounts and reaction conditions described in Table 3 were used in the tests. The procedure of the reaction was generally as follows. The starting materials were mixed in the reactor, at room temperature. Vacuum was drawn into the reactor and the temperature was raised to 60-70° C. to remove the moisture present in the starting materials. Thereafter the temperature is raised to 115° C. When so desired, starch acetate can be added to the reaction mixture, or all the acetate can be fed into the reaction mixture in the starting situation, according to the desired product distribution. The reaction is continued for the period indicated in the table, whereafter the reaction mixture, which has turned into a viscous melt, is cast at >100° C. into cold water. The reaction mixture is ground in the water, a white pulverous product is filtered out and is washed with water to remove any excess glycol.

content of the products remains high. The linking of the glycol to the product was verified on the basis of an NMR analysis. By the NMR technique it is also possible, with the help of an end group analysis, to estimate the molecular weight. The NMR results and the GPC results, which are shown in Table 3, support each other in the determination of the molecular weight.

The reaction also produces low-molecular-weight water-soluble products, which are seen in the HPLC analysis in the monomer, dimer and oligomer retention times.

Tests 9TG1 and 9TG2 studied the reproducibility of the reaction relative to the product yield. The amount of water-insoluble product was in each case 75%. The respective yield in test 7TG5 was 57%. A completely water-soluble product was obtained as the product in test 9TG3.

The position of the acetyl groups in product 7TG11, prepared from the acetate of an amylose-rich starch, was characterized by the $^{13}$C-NMR technique, and the product was compared with the corresponding distribution in the starting material. Table 4 shows the obtained distribution, in which it can be seen that a few acetyl groups have split from the C-6 position and even fewer from the C-2 position. By means of the reaction conditions it is possible to affect the retention of the acetyl groups in the product (cf. Example 1). This provides a possibility to produce products having different acetyl protections. The acetyl group content and their position distribution significantly affect the behavior of the product in, for example, polymerization reactions and, via this, also the grade of the synthesized polymer.

TABLE 4

Distribution of acetyl groups in product 7TG11 as compared with the starting starch acetate

| Polymer | DS total | DS C-2 | C-2 % Ac | DS C-3 | C-3 % Ac | DS C-6 | C-6 % Ac |
|---|---|---|---|---|---|---|---|
| C6M100 | 3.02 | 0.93 | 30.79 | 1.09 | 36.09 | 1.00 | 33.11 |
| 7TG11-01 | 2.45 | 0.78 | 31.84 | 1.02 | 41.63 | 0.65 | 26.53 |

TABLE 3

Transglycosylation of starch acetate with ethylene glycol

| Reaction | Starch | Diol mass ratio | Time, h min | Temperature, ° C. | Mw | Mn | Mw/Mn | DS Hydrol. | DS NMR |
|---|---|---|---|---|---|---|---|---|---|
| 7TG5 | C6N100 | 0.55 | 10:00 | 115-120 | 95,200 | 9,800 | 9.7 | | 2.6 |
| 7TG7 | C6N100 | 1.0 | 4:40 | 115-120 | 13,300 | 6,500 | 2.0 | | 2.2 |
| 7TG9 | C6N100 | 1.0 | 4:00 | 115-120 | 17,700 | 7,000 | 2.5 | 2.8 | 2.1-2.3 |
| 7TG10 | C6N100 | 1.0 | 3:30 | 115-120 | 74,000 | 12,200 | 6.0 | 3.0 | |
| 7TG11 | C6M100 | 0.7 | 3:00 | 115-120 | 11,700 | 6,400 | 1.8 | 2.7 | 2.45 |
| 9TG1 | C6N100 | 1.0 | 2:30 | 100 | | | | | |
| 9TG2 | C6N100 | 1.0 | 2:30 | 100 | | | | | |
| 9TG3 | C5N100 | 1.0 | 3:40 | 100 | | | | | |

Starch polymer: C5N100 native potato starch acetate, DS 2.1
Starch polymer: C6N100 native potato starch acetate, DS: 2.8
Starch polymer: C6M100 corn starch (HYLON-VII) acetate, DS: 2.8

The effect of the reaction conditions on the product properties is shown in Table 3. On the basis of the molecular mass determinations, starch acetate can be degraded in a controlled manner, for example, into molecules containing 300-30 glucose units (acetylated). The two-step adding of the starch acetate also affects the molecular weight and the molecular weight distribution. The tests also indicate that the acetyl The number of 1-6-α bonds as compared with the starting material was also analyzed from the product by the NMR technique. The proportion of the said bonds in the starting material had dropped from the starting level (0.9%) to a level (0.7%) that indicates that the percentage of bonds characteristic of amylopectin had decreased. The results are shown in greater detail in the table below (Table 5).

TABLE 5

Results of the $^1$H NMR analysis of product 7TG11-01

| Bond type | C6M100 | 7TG11-01 |
|---|---|---|
| Acetyl | DS 2.86 | DS: 2.35 |
| 1-6-α-, 4.99 ppm | 0.9% | 0.7% |
| 1-glycol-β-4.57 ppm | — | 1.4% |
| C-2 ether ? 5.6-5.7 ppm | — | 1.0% |

The glycol:glucose molar ratio obtained for transglycosylation product 7TG11-01 is 3:100; the α:β ratio is assumed to be 2:3. On the basis of this assumption it has been possible to estimate the percentage of bonds characteristic of amylopectin in product 7TG11-01.

EXAMPLE 6

Transglycosylation Reaction of Starch Acetate in a 250-Liter Drais Reactor

Test 1

Starch acetate (C6N100 EP Batch 5C48-49, 34.1 kg) was introduced into the reactor, and stirring was switched on (stirrer/homogenizer 85 rpm/1500 rpm). Ethylene glycol (32.2 kg), into which there had been mixed 69 g of a 93% sulfuric acid, was added. The reaction mixture was stirred for 30 min, whereafter vacuum was switched on and heating to 110-120° C. was started, at which temperature the reaction mixture was maintained for 1 h 15 min. After the reaction the vacuum pump was switched off and the product was precipitated from water while being stirred. The further procedure was as in Example 5.

As a result of the test it was seen that the reaction can also be scaled to a larger scale.

Test 2

Starch acetate (C6N100 EP Batch 5C48-49, 34.1 kg) was introduced into the reactor, and stirring was switched on (stirrer/homogenizer 85 rpm/1500 rpm). Ethylene glycol (32.2 kg), into which there had been mixed 69 g of a 93% sulfuric acid, was added. The reaction mixture was stirred for 30 min, whereafter vacuum was switched on and the heating of the reactor to 110-120° C. was started, at which temperature the reaction mixture was maintained for 1 h. Thereafter the sulfuric acid present in the reaction mixture was neutralized with calcium carbonate and the evaporation of any excess ethylene glycol by means of vacuum was started. When the ethylene glycol had been evaporated, the product was cooled and was ground in the reactor to fine powder (250TG3-02). The test showed that it is possible to prepare a transglycosylation product in a one-step process in a case in which the product can be used as such for the targeted application. Thus the process can be simplified substantially and the manufacturing costs can be reduced.

Test 3

The procedure was as in test 2, but after the vacuum evaporation of ethylene glycol the vacuum pump was switched off and 26 kg of triethyl citrate was added to the molten mix and it was mixed to a smooth melt at 110-120° C.

The test showed that the preparation of a hot-melt adhesive is possible as a continuation of the transglycosylation reaction.

EXAMPLE 7

Preparation of Hot-Melt Adhesives from Starch Acetate Transglycosylation Products Products according to the following table (Table 6) were prepared by melting the mixtures at 140° C. The melt was mixed until it was completely clear.

TABLE 6

| Adhesive | TG product 1/amount | TG product 2/amount | Plasticizer/amount |
|---|---|---|---|
| I | Example 5 (7TG5)/100 g | | Triethyl citrate/70 g |
| II | Example 6, Test 2/100 g | | Triethyl citrate/40 kg |
| III | Example 6, Test 3 | | |
| IV | Example 5 (7TG10)/100 g | | PEGS/50 g |
| V | Example 5 (7TG10)/100 g | | PEGS/100 g |
| VI | Example 5 (7TG10)/100 g | Example 5 (7TG9)/100 g | Triethyl citrate/130 g |
| VII | Example 5 (7TG11)/1 kg | Example 5 (9TG1)/1 kg | Triethyl citrate/1.3 kg |
| VIII | Example 5 (9TG2)/1 kg | Example 6, Test 2/4 kg | Triethyl citrate/2.25 kg |
| IX | Example 5 (7TG7)/190 g | | Triethyl citrate/130 g Sylvatac 80/10 g |

PEGS = polyethylene succinate, experimental product of the Technical Research Centre of Finland (VTT),
Sylvatac 80 = glycerol ester of resin, Arizona Chemical Oy The adhesive properties of hot-melt adhesives were tested by applying the adhesives in molten state (at 135-140° C.) by means of a slit nozzle to the surface of paper and by pressing immediately another paper on the surface of the adhesive. After the adhesive joint had cooled, the glued papers were pulled apart, whereupon the result was a 100% fiber tear in the paper, i.e. the gluing was a success. By the varying of the grade of the TG product, the plasticizer and the proportions of the raw materials it is possible to affect the melt viscosity and softness of the adhesive.

EXAMPLE 8

Acetylated Anhydroglucose Oligomer as a Macroinitiator in Ring-Opening Polymerization of ε-Caprolactone The anhydroglucose oligomer (7TG7) prepared according to Example 5 from potato starch acetate was used as a macroindicator in ring-opening polymerization of ε-caprolactone. Tin octoate was used as the initiator of polymerization.

In the laboratory test, 5 g of ε-caprolactone, 3.1 g of acetylated anhydroglucose oligomer as a co-initiator, and 0.03 molar % of tin octoate, calculated from the total material amount, as the initiator were weighed into a test tube. The polymerization was carried in a 140° C. oil bath. The test tube was agitated at even intervals. The polymerization time was 18 hours. The number average molar mass of the obtained polymer, measured by GPC, was 9600 g/mol compared with polystyrene standards, and the conversion in the polymerization was >99%. The glass transition temperature measured was −53° C. and the melting temperature obtained was 45° C.

EXAMPLE 9

Varying Amounts of Acetylated Anhydroglucose Oligomer as a Macroinitiator in Ring-Opening Polymerization of ε-Caprolactone The reactions were carried out as in Example 8, but the acetylated anhydroglucose oligomer (1) was used in varying amounts relative to the ε-caprolactone. The amounts of the materials used are shown in Table 7. The initiator used for the polymerization was 0.03 molar % of tin octoate, calculated from the total amount of material. The analysis results for the monomers prepared are also shown in Table 7.

TABLE 7

Amounts used and polymer analysis results

| 1 (g) | 2 (g) | $M_w$ (g/mol) | $M_n$ (g/mol) | $M_w/M_n$ | Conversion | $T_g$ (° C.) | $T_m$ (° C.) | ΔH (J/g) |
|---|---|---|---|---|---|---|---|---|
| 0.01 | 5 | 647000 | 167000 | 3.9 | 100 | −61 | 58 | −68 |
| 0.12 | 5 | 411000 | 103000 | 4.0 | 100 | −61 | 56 | −72 |
| 1.2 | 5 | 56200 | 16700 | 3.4 | 100 | −48 | 47 | −54 |
| 2.4 | 5 | 41700 | 14400 | 2.9 | 100 | −55 | 42 | −24 |
| 3.1 | 5 | 37600 | 12600 | 3.0 | 99 | −52 | 47 | −18 |
| 3.8 | 5 | 35800 | 11200 | 3.2 | 99 | −47 | 47 | −7 |
| 3.9 | 4 | 28600 | 10100 | 2.8 | 99 | −34 | 47 | −7 |

EXAMPLE 10

Acetylated Anhydroglucose Oligomer as a Large-Sized Co-Monomer in Lactic-Acid Condensation Polymerization The anhydroglycose oligomer (7TG7) prepared according to Example 5 from potato starch acetate was used as a co-monomer in lactic-acid condensation polymerization. The polymerization catalyst used was tin octoate.

The condensation polymerizations of lactic acid and acetylated anhydroglucose oligomer were carried out in test tubes. To promote the removal of the condensation water formed in the reaction, a nitrogen flow was directed via a distillation capillary to below the surface of the reaction mixture. A mass proportion of acetylated glucose oligomer (1), calculated from the amount of lactic acid, was weighed into the test tubes. Tin octoate in an amount of 0.05 molar %, calculated from the total amount, was used as the polymerization catelyst. The test tubes were placed in a 120° C. oil bath, the temperature of which was raised to 180 degrees at even intervals in the course of 2 hours. The total polymerization time was 23 hours. The polymer analysis results are shown in Table 8.

TABLE 8

Amount of acetylated anhydrogluxose used in condensation polymerization, and polymer analysis results

| 1 (g) | $M_w$ (g/mol) | $M_n$ (g/mol) | MWD | $T_g$ (° C.) | $T_m$ (° C.) | ΔH (J/g) |
|---|---|---|---|---|---|---|
| 0 | 33800 | 19400 | 1.7 | 48 | 155 | −23.9 |
| 5 | 28700 | 12200 | 2.4 | 34 | — | — |
| 10 | 19500 | 6700 | 2.9 | 41 | — | — |
| 15 | 16900 | 5700 | 3 | 43 | — | — |
| 20 | 19000 | 5800 | 3.3 | 49 | — | — |

EXAMPLE 11

Acetylated Anhydroglucose Oligomer as a Prepolymer in Polyurethane Synthesis

The acetylated anhydroglucose oligomer (7TG11) prepared according to Example 5 from amylose-rich corn starch acetate was used as one of the prepolymers for polyurethane to be prepared by linking.

The linking of the acetylated anhydroglucose oligomer and a hydroxyl-terminated lactic-acid prepolymer was carried out as bulk polymerization in a melt mixer. 25 g of the acetylated anhydroglucose oligomer and 25 g of the hydroxyl-terminated lactic-acid prepolymer were weighed into the melt mixer. 1.5 ml of 1,6-hexamethylenide isocyanate was injected as a linking agent into the melt mixture. The polymerization temperature was 160° C. and the polymerization time was 30 minutes. The mass-average molar mass obtained for the polymer by GPC was 59100 g/mol and the polydispersity obtained qas 4.0. The glass transition temperatures of the block polymer were 51° C. and 150° C.

EXAMPLE 12

Acetylated Anhydroglucose Oligomer as a Prepolymer in Polyurethane Synthesis

The linking of the acetylated anhydroglucose oligomer (7TG7) prepared according to Example 5 from potato starch acetate and a hydroxyl-terminated polycaprolactone prepolymer was carried out as solution polymerization.

50 ml of dimethyl sulfoxide, 5 g of polycaprolactone prepolymer and 5 g of acetylated anhydroglucose oligomer were placed in a 100 ml three-necked flask. The flask was placed in a 100° C. oil bath, and an argon-containing balloon was placed at the end of the reflux condenser in order to maintain an inert atmosphere. After the prepolymers had dissolved, 0.204 g of the 1,6-hexamethylenide isocyanate used as the linking agent was injected into the reaction mixture ($n_{OH}$: $n_{NCO}$=1:1, assuming that only the OH groups terminating the acetylated anhydroglucose unit molecule react). After the reaction time (3 hours) the polymer was precipitated with ethanol. The final product obtained was an urethane polymer for which a mass average molar mass of 35300 g/mol and glass transition temperatures of −59.2° C. and 158.0° C. were obtained.

EXAMPLE 13

Varying Amounts of Acetylated Anhydroglucose Oligomer in Polyurethane Synthesis

Polymerizations were carried out as in Example 18, except that the proportions of the pre-polymers were changed according to Table 3. The polycaprolactone polymer (1) and the acetylated anhydroxyglucose oligomer (2) were dissolved in 50 ml of dimethyl sulfoxide. 1.6-hexamethylenide isocyanate (3) was injected as a linking agent ($n_{OH}$: $n_{NCO}$=1:1, assuming that only the OH groups terminating the acetylated anhydroglucose unit molecule react). The analysis results are shown in Table 9.

TABLE 9

Polyurethanes prepared using varying proportions

| 1 g | 2 g | 3 g | $M_w$ g/mol | $M_w/M_n$ | $T_{g1}$ ° C. | $T_{g2}$ ° C. |
|---|---|---|---|---|---|---|
| 7.5 | 2.5 | 0.176 | 35800 | 1.5 | −61 | — |
| 2.5 | 7.5 | 0.231 | 27000 | 1.7 | — | 163 |

It is seen on the basis of Examples 8-13 that the transglycosylation products can also be used as raw materials for polymers in various polymerization reactions. It is possible to use the products having low melting temperatures (Examples 8 and 9) in hot-melt adhesives without an external plasticizer, and the other products in adhesive formulations according to Example 7.

EXAMPLE 14

Use of a Starch Acetate Transglycosylation Product for the Coating of Foamed Starch Products From the product according to Example 5 (7TG10, 20 g) a solution was prepared in acetone (280 g). 14 g of triacetin was added to the solution. The solution was atomized onto the surfaces of test specimens prepared from foamed thermoplastic starch, the acetone was removed by evaporation at room temperature, and the coated product was finally dried at 100° C. for 30 min. The coating adhered well to the surface of the specimen, the coating did not crack, and the specimen did not undergo damage but retained its shape well. The coating was also water-resistant, since a drop of water was not absorbed through the coating within one hour. An uncoated specimen did not withstand water. Its structure broke/shrank when treated with water.

On the basis of the test it can be noted that starch acetate transglycosylation products are suited for water-resistant coatings. If it is not desirable to use solvents, the coating can also be carried out by a melt technique, e.g. by extrusion, by using the melt formulations described in Example 7. Other plasticizers suitable for starch acetate are also usable.

EXAMPLE 15

Transglycosylation with Ethylene Glycol of a Starch Derivative Containing Cationic Groups The reaction was carried out in a manner corresponding to that in Example 5 by using the materials amounts and reaction temperatures indicated in Table 10.

TABLE 10

| Test | Cationic starch/g | Cationic starch/diol mass ratio | Sulfuric acid (93%) | Reaction conditions T, ° C./time, min | Nitrogen content of product, % |
|---|---|---|---|---|---|
| 1 | TA-74.2/50 | 1:1 | 0.3 | 113-118/360 | 0.7 |
| 2 | Raisabond 15 | 1:1 | 3.3 | 113 → 118/60 | 1.2 |
| 3 | Raisabond 15 | 1:1 | 3.3 | 72 → 119/10 | 1.2 |

Raisabond 15 = cationic starch, DS 0.2, Raisio Chemicals Oy
TA74.2 = Acetate, $DS_{acet}$ 2.5 (experimental product of the Technical Research Center of Finland, VTT) prepared from Raisabond 15

After the reaction, the products were poured into water and the sulfuric acid was neutralized with sodium hydroxide. The products were all water-soluble. The products were purified by ultrafiltration (cutoff value of the ultrafiltration film was 5000) for analysis.

The purpose of the example is to indicate that also other starch derivatives can be used as starting substances in the reaction.

EXAMPLE 16

Starch Derivative

The ether according to Formula 1 was prepared by using the method according to Example 1.

| | |
|---|---|
| Intrinsic ethylene glycol ether | 9% diol 18% ether bonds |
| Degree of acetylation | DS 0.9 C-2: 0.35; C-3: 0.44; C-6: 0.1 |
| Degree of polymerization | aver. 5.6 AGU at each end of diol |
| Mw: | 3200 g/mol |
| HPLC purity | 100% (no monomer, no free diol) |
| NMR | AGU C-1 alpha: 12%; AGU C-1 beta: 6% | diol ether

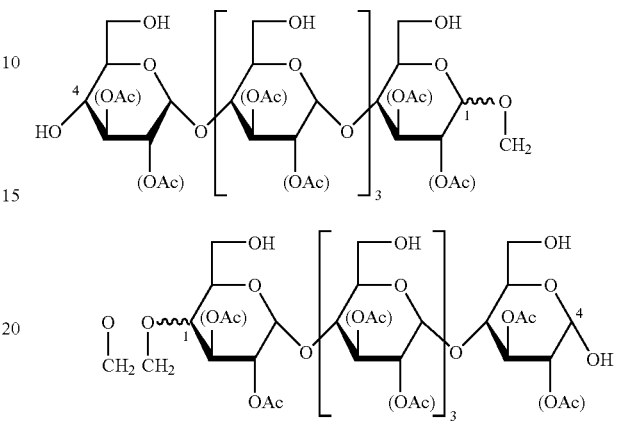

Yield 30%

Purification:
1) reaction mixture 1 part by weight + 10 parts by weight of isopropanol
2) wash with acetone, drying 24 h 20° C., 12 h 50° C. in a convection oven The derivative is water-soluble, and it can be used for preparing a solution adhesive having a solids content of 60%.

The invention claimed is:

1. An intra-chain etherified starch acetate comprising a unit having the formula

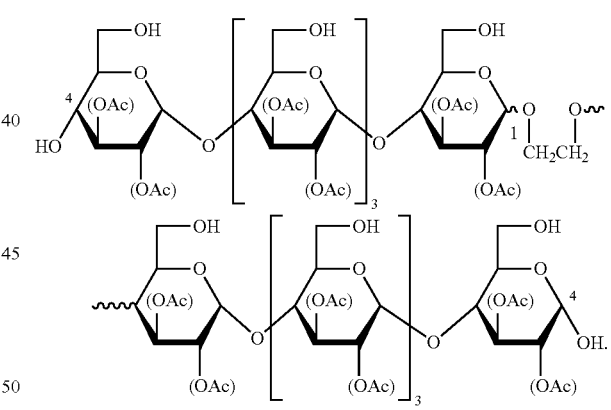

wherein said intra-chain etherified starch acetate is prepared in a process comprising reacting an ester derivative of starch at acid conditions with an alkanol containing 2 hydroxyl groups, by mixing the starch ester with a diol to form a reaction mixture, heating the reaction mixture, and continuing the reaction of the starch ester with the diol until a clear mixture is obtained, cooling the reaction mixture and recovering the reaction product, wherein the degree of substitution (DS) of the starch ester is 2.0-3.0.

2. The starch acetate according to claim 1, wherein said starch acetate is water-soluble.

* * * * *